United States Patent
Davis

(10) Patent No.: US 10,242,552 B1
(45) Date of Patent: Mar. 26, 2019

(54) CHILD SAFETY ALARM SYSTEM

(71) Applicant: Mitchell Davis, Manor, TX (US)

(72) Inventor: Mitchell Davis, Manor, TX (US)

( * ) Notice: Subject to any disclaimer, the term of this patent is extended or adjusted under 35 U.S.C. 154(b) by 0 days.

(21) Appl. No.: 15/809,918

(22) Filed: Nov. 10, 2017

Related U.S. Application Data

(60) Provisional application No. 62/420,459, filed on Nov. 10, 2016.

(51) Int. Cl.
| | | |
|---|---|---|
| *G08B 21/22* | (2006.01) | |
| *G08B 21/02* | (2006.01) | |
| *B60N 2/00* | (2006.01) | |
| *B60Q 1/52* | (2006.01) | |
| *B60Q 5/00* | (2006.01) | |
| *H04W 4/14* | (2009.01) | |

(52) U.S. Cl.
CPC ............. *G08B 21/22* (2013.01); *B60N 2/002* (2013.01); *B60Q 1/52* (2013.01); *B60Q 5/005* (2013.01); *G08B 21/02* (2013.01); *H04W 4/14* (2013.01)

(58) Field of Classification Search
CPC .. B60N 2/002; B60N 2/26; B60N 2/28; B60R 21/01512; B60R 21/0153–21/01538; G08B 21/22; G08B 21/24
USPC ................. 340/573.1, 573.4, 539.11–539.13
See application file for complete search history.

(56) References Cited

U.S. PATENT DOCUMENTS

| | | | | |
|---|---|---|---|---|
| 8,058,983 | B1* | 11/2011 | Davisson | G08B 21/0205 340/10.1 |
| 9,227,484 | B1* | 1/2016 | Justice | B60N 2/002 |
| 9,381,855 | B1* | 7/2016 | Arnold | B60Q 5/005 |
| 9,741,324 | B2* | 8/2017 | Baldwin, Sr. | G10D 13/024 |
| 2004/0155781 | A1* | 8/2004 | DeOme | G08B 13/19621 340/573.1 |
| 2009/0234542 | A1* | 9/2009 | Orlewski | B60N 2/002 701/45 |
| 2013/0194089 | A1* | 8/2013 | Estrada | G08B 21/22 340/457.1 |
| 2016/0155310 | A1* | 6/2016 | Joao | G01C 21/34 340/573.1 |
| 2017/0372579 | A1* | 12/2017 | Williamson | G08B 21/0205 |

* cited by examiner

*Primary Examiner* — John A Tweel, Jr.
(74) *Attorney, Agent, or Firm* — Eldredge Law Firm, LLC; Richard Eldredge; Beth Felix

(57) ABSTRACT

A vehicle having a horn and a light includes an alarm system secured to a ceiling of the vehicle. The alarm system includes a housing secured to the ceiling; a computer carried within the housing and in data communication with a thermal imaging sensor configured to determine if a party is left behind after the driver leaves the vehicle; a transceiver operably associated with the computer; and a mobile device operably associated with the transceiver. The method to notify a driver and/or third party if a party is left behind in a vehicle includes determining if the party is left behind via the thermal imaging sensor; and wirelessly notifying driver that the party has been left behind.

16 Claims, 3 Drawing Sheets

CHILD SAFETY ALARM SYSTEM

BACKGROUND

1. Field of the Invention

The present invention relates generally to safety systems, and more specifically, to a child safety alarm system for a vehicle.

2. Description of Related Art

Vehicles are well known in the art and are commonly used to transport persons such as children, infants, elderly and/or animals. FIG. 1 depicts a simplified side view of a conventional vehicle 101 having a frame 103 and a door 105 pivotally attached thereto. In FIG. 2, the inside of vehicle 101 is shown. As depicted, vehicle 101 includes a front seat 201, a rear seat 203, and in the exemplary embodiment, a child car seat 205 removably secured to rear seat 203 and configured to secure a child thereto during transport. Vehicle 101 is further provided with a car computer 207 which can be operably associated with the horn 209 and light 211, which could include the front headlights or a dashboard light. In one embodiment, the vehicle computer 207 could include a GPS device and transceiver configured to wireless communicate with third parties.

It should be understood that excessive heat could cause illness or death to a child, infant, elderly person, and/or pet left behind in the closed vehicle. It is commonly known that drivers will unintentionally leave the child, infant, elderly person, and/or pet locked in the vehicle upon leaving. A locked vehicle exposed to the sun during hot summer days could result in serious physical injury.

Although great strides have been made in the area of vehicle safety systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
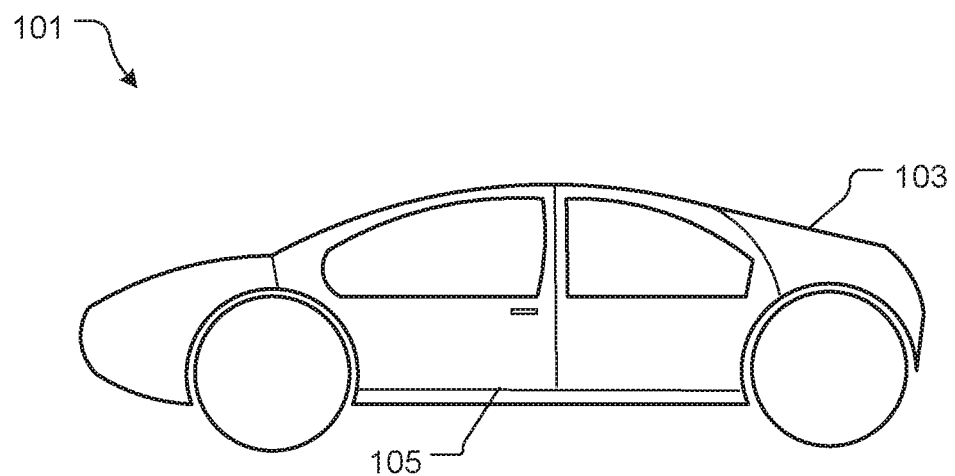
FIG. 1 is a side view of a conventional vehicle.
Figure 2:
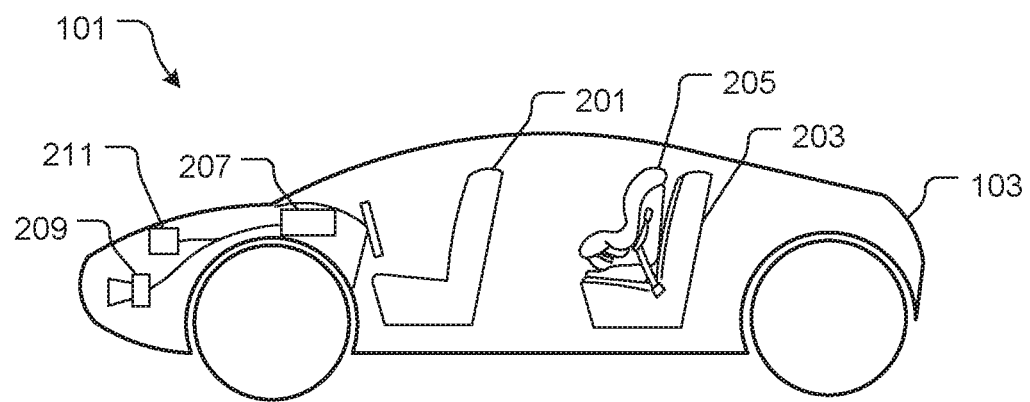
FIG. 2 is an inside view of the vehicle of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicles. Specifically, the alarm system of the present application is configured to provide rapid and effective means to notify the driver and/or other third party when a child, elderly person, disabled person, pet or the like is left behind in a vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 3:
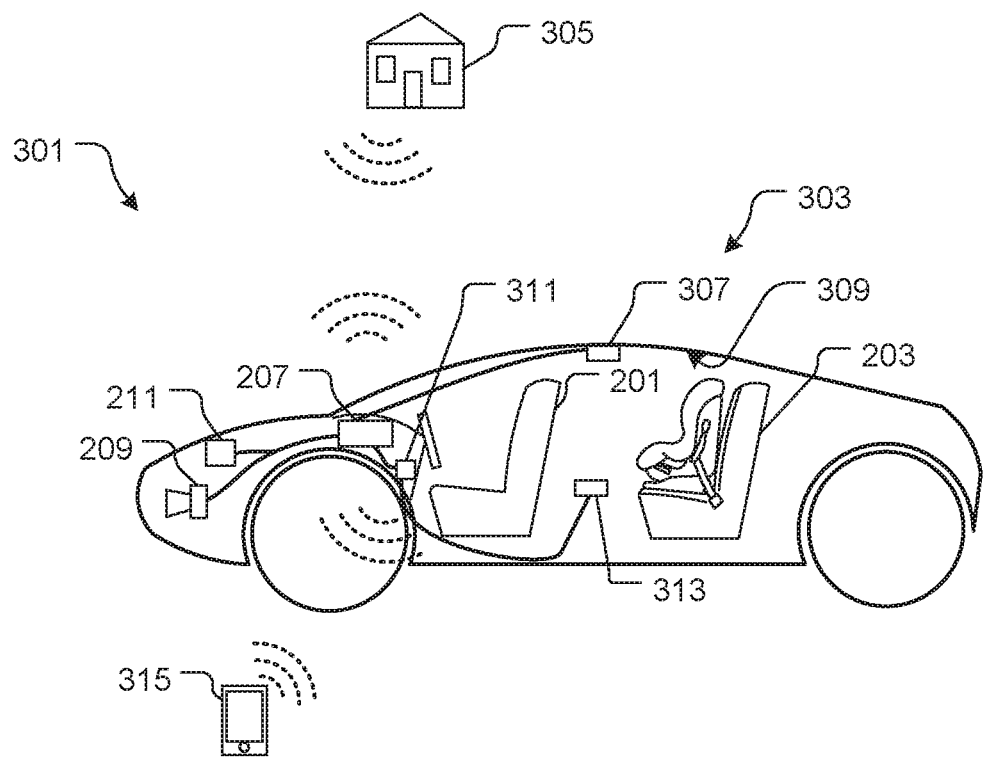
FIG. 3 is a simplified side view of a vehicle having an alarm system in accordance with a preferred embodiment of the present application.
Figure 4:
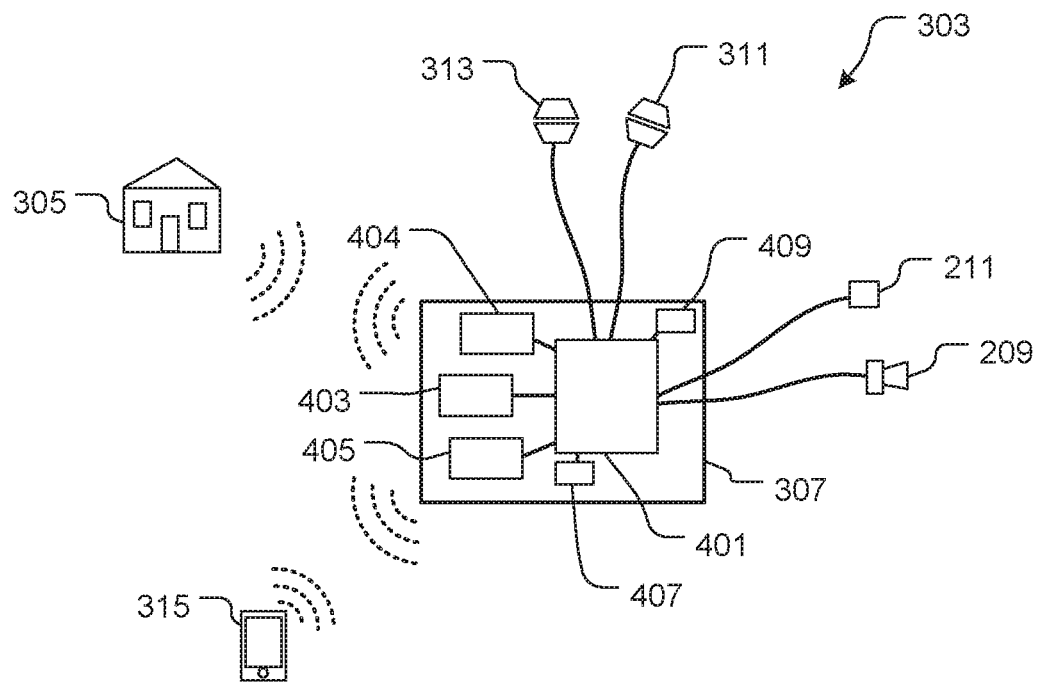
FIG. 4 is a simplified diagram of the alarm system of FIG. 3.

Referring now to the drawings wherein like reference characters identify corresponding or similar elements throughout the several views, FIGS. 3 and 4 depict respective side and schematic views of a vehicle 301 and alarm system 303 in accordance with a preferred embodiment of the present application. It will be appreciated that vehicle 301 overcomes one of more of the above-listed problems commonly associated with the conventional vehicles.

In the contemplated embodiment, alarm system 303 is configured to detect the presence of a person or animal left behind and thereafter notify the driver and/or a third party. In one embodiment, the alarm system 303 could be adapted for use with the car computer 207, which in turn allows the system 303 to communicate with third parties, e.g., the police, ONSTAR assistance, and the like, as depicted by structure 305. It will be appreciated that system 303 could be used as a retrofit to existing vehicles 101 and/or manufactured with one or more of the devices discussed herein. Accordingly, system 303 could include a detachable housing 307 secured to a ceiling 309 of the vehicle 301.

In the exemplary embodiment, housing 307 is configured to carry the necessary hardware to achieve the features discussed herein. A computer 401 is disposed within the walls of housing 307 and is conductively coupled to various components, sensors, and the like associated with system 303. In one embodiment, the computer 401 is preferably conductively coupled to vehicle computer 207. Thus, in the contemplated embodiment, the system computer 401 is in data communication with vehicle computer 207 and is configured to manipulate the horn 209, light 211, and/or transceiver means, e.g., ONSTAR, during use.

System 303 is provided with one or more sensors such as a key ignition sensor 311 or a plurality of other different types of sensors 313, as will be discussed below. During use, the computer 401 is configured to receive data from each sensor, which in turn enables the computer 401 to activate one or more notification devices.

Referring specifically to FIG. 4, a simplified schematic of the preferred system 303 are shown. It should be understood that the computer 401 and the various associated sensors are used together to determine if a child is left behind in the car as the driver exits the vehicle 301. In one embodiment, the plurality of sensors 313 could include, but not limited to, a temperature sensor, a motion sensor, an audio sensor, a low-fuel sensor and/or a door trigger sensor. These sensors are conductively coupled to the computer 401 could spaced apart from housing 307; however, it will be appreciated that alternative embodiments could include these and other sensors secured directly to the housing 307. One or more additional sensors are also contemplated in alternative embodiments. With respect to the low-fuel sensor, the system 303 is adapted to determine when the driver is merely fueling the vehicle to prevent false alarms.

The system 303 is further provided with a transceiver 403 configured to communicate with a mobile phone 315 via BLUETOOTH technology, cellular transmission, WiFi, and/or other wireless transmission means. The transceiver 403 could also be adapted to communicate directly with third parties via text messages for sending a flash SMS to one or more device in a predetermined proximity.

It is also contemplated having a GPS chip 404 and a BLUETOOTH chip 405. During use, the GPS chip 404 could be utilized to provide the position of the vehicle 301 for location identification, while the chip 405 could be utilized for communication means.

The system 303 is further provided with one or more thermal imaging sensors 407 for detecting the presence of a persons and/or pet left within the vehicle. In the preferred embodiment, the thermal imaging sensors are micro bolometers; however, other types of thermal imaging sensors are contemplated in alternative embodiments. In one contemplated embodiment, four sensors 407 are utilized. A microphone/speaker 409 is secured to the housing 307 and configured to allow communication between the transceiver 403 and the mobile phone 315 and/or third party 305.

The mobile phone 315 can be configured to emit a signal, for example, one or more of a light, vibration or audible noise signal that can be seen, felt, or heard by the driver or third party when system 303 is activated. For example, a smartphone could include an application that receives and notifies the driver in the event that a child, elderly person, and/or pet is left behind. Such notifications could be a phone call, text message, ring tone, and the like.

In lieu of or in addition to sending a signal to the mobile device 311, also contemplated is incorporating the features of system 303 with alerting third parties such as a transceiver of a police station 305 via wireless transmission, e.g., cellular data communication. Thus, a police person, fireman, or medical person can be notified via the system transceiver. As discussed, the system could also transmit a SMS text message notification to a plurality of mobile devices and/or similar devices within a determined proximity, e.g., 1 mile radius. Accordingly, third parties in a store parking lot could be notified of the vehicle location via the text message and location identification via the GPS chip 403.

One of the unique features believed characteristic of the present application is the ability to determine the presence of a child, elderly person, and/or dog in a locked car and to notify the driver and/or a third party in the event such situations occur. These features are achieved via sensors and notification devices on the car, via a mobile device carried by the driver, or notification to a third party as discussed above.

It should be appreciated that system 303 could be utilized as a stand-alone system retrofitted in existing vehicles without the need to communicate with the vehicle computer and/or utilize the notification devices, e.g., lights, horn, and the like. In the preferred embodiment, the housing 307 is placed on an inner surface of the inside of the vehicle, which in turn enables the sensors associated with the housing to detect the presence of the party and/or animal left behind.

Figure 5:
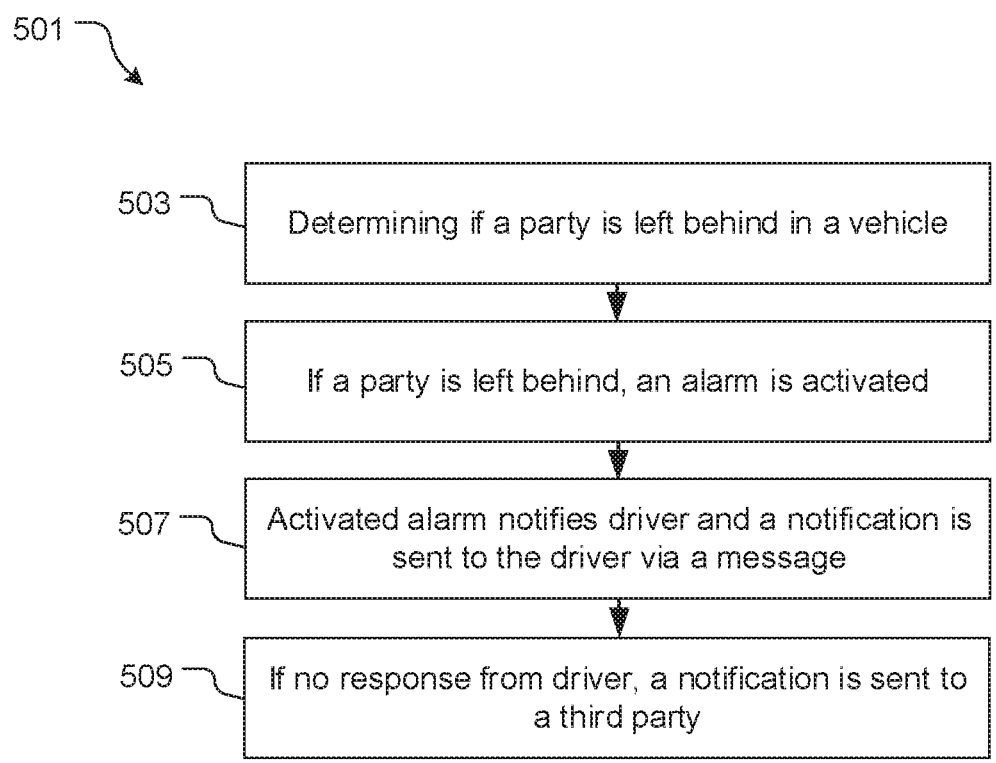
FIG. 5 is a flowchart depicting the preferred method of use.

Referring now to FIG. 5, a flowchart depicts one preferred method of use including installing the system 303 within the vehicle 301 and thereafter determining if a party and/or animal is left behind after the driver leaves via one or more of the devices discussed above. If the party and/or animal has been left behind, then the system is configured to activate an alarm and to send the driver a message via the mobile device. If no response is made by the driver, then other third parties are notified, as discussed above. These steps are outlined in boxes 503-509 shown in FIG. 5.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle, comprising:
   an alarm system secured to a ceiling of the vehicle, the alarm system having:
      a housing secured to the ceiling;
      a computer carried within the housing and in data communication with a thermal imaging sensor configured to determine if a party is left behind after the driver leaves the vehicle;
      a transceiver operably associated with the computer; and
      a speaker associated with the housing;
   a mobile device configured to wirelessly communicate with the alarm system via the transceiver;
   wherein the speaker transmits communication from the mobile device to the party left behind inside the vehicle; and
   wherein the mobile device receives a notification from the alarm system via the computer and wireless communication initiated via the transceiver if the party is left behind as determined via the thermal imaging sensor.

2. The vehicle of claim 1, further comprising:
   a horn operably associated with the alarm system;
   wherein the computer is configured to activate the horn based on a command from the computer, when the alarm system determines that a driver exits the vehicle and an infant is left in a car seat.

3. The vehicle of claim 1, further comprising:
a car light operably associated with the alarm system;
wherein the computer is configured to activate the car light based on a command from the computer, when the alarm system determines that a driver exits the vehicle and an infant is left in a car seat.

4. The vehicle of claim 1, the alarm system further comprising:
a second sensor operably associated with the computer;
wherein the second sensor is a thermometer configured to determine an inside temperature of the vehicle.

5. The vehicle of claim 1, wherein the mobile device is a mobile phone.

6. The vehicle of claim 1, wherein the mobile device is configured to emit an audible sound based on a command from the computer, when the alarm system determines that a driver exits the vehicle and an infant is left in a car seat.

7. The vehicle of claim 1, wherein the transceiver is configured to send a SMS text message notification to a third party within a predetermined distance based on a command from the computer, when the alarm system determines that a driver exits the vehicle and an infant is left in a car seat.

8. The vehicle of claim 1, wherein the transceiver is configured to communicate with with a third party transceiver based on a command from the computer, when the alarm system determines that a driver exits the vehicle and an infant is left in a car seat.

9. The vehicle of claim 8, wherein the third party transceiver is a police station transceiver.

10. The vehicle of claim 1, wherein the thermal imaging sensor is a micro bolometer.

11. The vehicle of claim 1, wherein the computer communicates with an ONSTAR device associated with the vehicle based on a command from the computer, when the alarm system determines that a driver exits the vehicle and an infant is left in a car seat.

12. The vehicle of claim 1, further comprising:
a low-fuel sensor conductively coupled to the computer.

13. A method to notify a driver and/or third party if the party is left behind in a vehicle, the method comprising:
providing the alarm system of claim 1;
determining if the party is left behind via the thermal imaging sensor; and
wirelessly notifying the driver that the party has been left behind; and
communicating with the party left behind via the microphone conductively coupled to the computer.

14. The method of claim 13, further comprising:
notifying third parties that the party has been left behind.

15. The method of claim 14, further comprising:
sending a plurality of text messages within a determined proximity to the vehicle.

16. The method of claim 13, wherein the thermal imaging sensor is a micro bolometer sensor.

* * * * *